United States Patent
Radhakrishnan et al.

(10) Patent No.: US 7,415,627 B1
(45) Date of Patent: Aug. 19, 2008

(54) PARTITIONING AND CATEGORIZING DATA IN A SPLIT-PLANE ARCHITECTURE FOR FAST RECOVERY FROM DATA PLANE FAILURES AND FAST RESTARTS

(75) Inventors: Janardhanan Radhakrishnan, Fremont, CA (US); Prakash Jayaraman, Fremont, CA (US); Shankar Agarwal, Fremont, CA (US); Premasish Deb, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 638 days.

(21) Appl. No.: 10/666,084

(22) Filed: Sep. 19, 2003

Related U.S. Application Data (60) Provisional application No. 60/455,623, filed on Mar. 17, 2003.

(51) Int. Cl.
*G06F 11/00* (2006.01)
(52) U.S. Cl. .............................. 714/4; 370/221; 709/224
(58) Field of Classification Search .................... 714/4; 370/221
See application file for complete search history.

(56) References Cited

U.S. PATENT DOCUMENTS

| | | | | |
|---|---|---|---|---|
| 5,581,543 A * | 12/1996 | Natarajan | ..................... | 370/221 |
| 5,862,125 A * | 1/1999 | Russ | ........................... | 370/228 |
| 5,903,545 A * | 5/1999 | Sabourin et al. | ............. | 370/225 |
| 5,963,540 A * | 10/1999 | Bhaskaran | ................... | 370/218 |
| 6,163,525 A * | 12/2000 | Bentall et al. | ............... | 370/227 |
| 6,327,669 B1 * | 12/2001 | Croslin | .......................... | 714/4 |
| 6,625,659 B1 * | 9/2003 | Aramizu et al. | ............. | 709/239 |
| 6,744,775 B1 * | 6/2004 | Beshai et al. | ................ | 370/409 |
| 6,947,963 B1 * | 9/2005 | Agarwal et al. | ............. | 709/201 |
| 6,963,926 B1 * | 11/2005 | Robinson | .................... | 709/239 |
| 2003/0193890 A1 * | 10/2003 | Tsillas et al. | ................ | 370/216 |

* cited by examiner

*Primary Examiner*—Christopher S McCarthy
(74) *Attorney, Agent, or Firm*—Townsend and Townsend and Crew (57) ABSTRACT

Routes between data planes are partitioned according to the source and destination data planes. Partitions are distributed according to the source data plane associated with the partition. Each data plane is configured to clear and resynchronize its own routes when a data plane fails. Also, the restarted data plane is configured to restore routes by retrieving partitions that have the restarted data plane as the source data plane.

28 Claims, 5 Drawing Sheets

PARTITIONING AND CATEGORIZING DATA IN A SPLIT-PLANE ARCHITECTURE FOR FAST RECOVERY FROM DATA PLANE FAILURES AND FAST RESTARTS

CROSS-REFERENCES TO RELATED APPLICATIONS

The present application is a non-provisional of and claims priority from U.S. Provisional Application No. 60/455,623, entitled "PARTITIONING AND CATEGORIZING DATA IN A SPLIT-PLANE ARCHITECTURE FOR FAST RECOVERY FROM DATA PLANE FAILURES AND FAST RESTARTS", filed Mar. 17, 2003, the entire contents of which are herein incorporated by reference for all purposes.

BACKGROUND OF THE INVENTION

The present invention generally relates to data processing in telecommunications systems and more specifically to separating route tables between data planes in a data structure and distributing different parts of the data structure to different data planes.

A split-plane architecture includes a control plane and one or more data planes. The data planes include virtual or physical circuits that route data for various applications, such as asynchronous transfer mode (ATM) circuits, Internet protocol (IP) route and bridging tables, and point-to-point protocol (PPP) sessions.

Each data plane includes a number of ports. A port on one data plane may exchange data with another port on the same data plane or a port on a different data plane. The control plane maintains a route table that includes the routes from a source data plane to a destination data plane. The routes are used by the data planes to determine where to send data. For example, a source data plane sends data received at a port to another port on the same data plane or a different data plane according to a route in the route table.

When a data plane crashes, data cannot be routed to the failed data plane or else a system failure may occur. Thus, the control plane should clear any routes that route data to the failed data plane in the route table. This may be referred to as "clearing the data plane". When the failed data plane becomes operational again, the control plane should restore the routes from the working data planes (those that did not fail) to the restarted data plane in the route table. Also, the routes from the restarted data plane to the working data planes should be restored. This is referred to as "data plane resynchronization". All of the above changes should also be communicated to the data planes.

Accordingly, when one of the data planes crashes, the control plane updates the routes for the other data planes so data is not transferred to the failed data plane. If the routes are not updated, errors may occur when data is transferred to a failed data plane. Also, when the failure condition is restarted, the control plane should update the routes for the restarted data plane so the restarted data plane can transfer data to the other data planes. Further, when the failure condition is restarted, the control plane restores the routes for the other data planes so that the other data planes transfer data to the restarted data plane. The control plane communicates all the above changes to the data planes.

Having the control plane as the central manager of the route table causes many problems when data planes fail. The route table typically includes a high number of routes. Thus, a lot of messaging between the control plane and other data planes is required in order to clear and resynchronize the data planes. For example, a split-plane architecture may include 16,000 point-to-point sessions distributed across all the data planes. The control plane becomes a bottleneck of the system because a large number of messages are required to clear or resynchronize the data planes. For example, applications running on the control plane may be blocked due to the resynchronization activity performed by the control plane whenever a data plane crashes and whenever a crashed data plane is restarted. The problem increases in complexity with respect to the number of data planes in the system. The more the number of data planes, the more resynchronization the control plane has to do. This in turn means that as the number of data planes increases, the processing the control plane needs to perform to resynchronize the data planes increases. Also, the number of messages the control plane needs to send increases as the number of data planes increases.

BRIEF SUMMARY OF THE INVENTION

Embodiments of the present invention relate to handling failures in a data plane. The routes between data planes are partitioned according to the source and destination data plane. Partitions are distributed according to the source data plane associated with the partition Each data plane is configured to clear and resynchronize its own routes when a data plane fails without the involvement of the control plane. Also, the restarted data plane is configured to restore routes by retrieving partitions that have the restarted data plane as the source data plane.

A further understanding of the major advantages of the invention herein may be realized by reference to the remaining portions of the specification and the attached drawings.

DETAILED DESCRIPTION OF THE INVENTION

Figure 1:
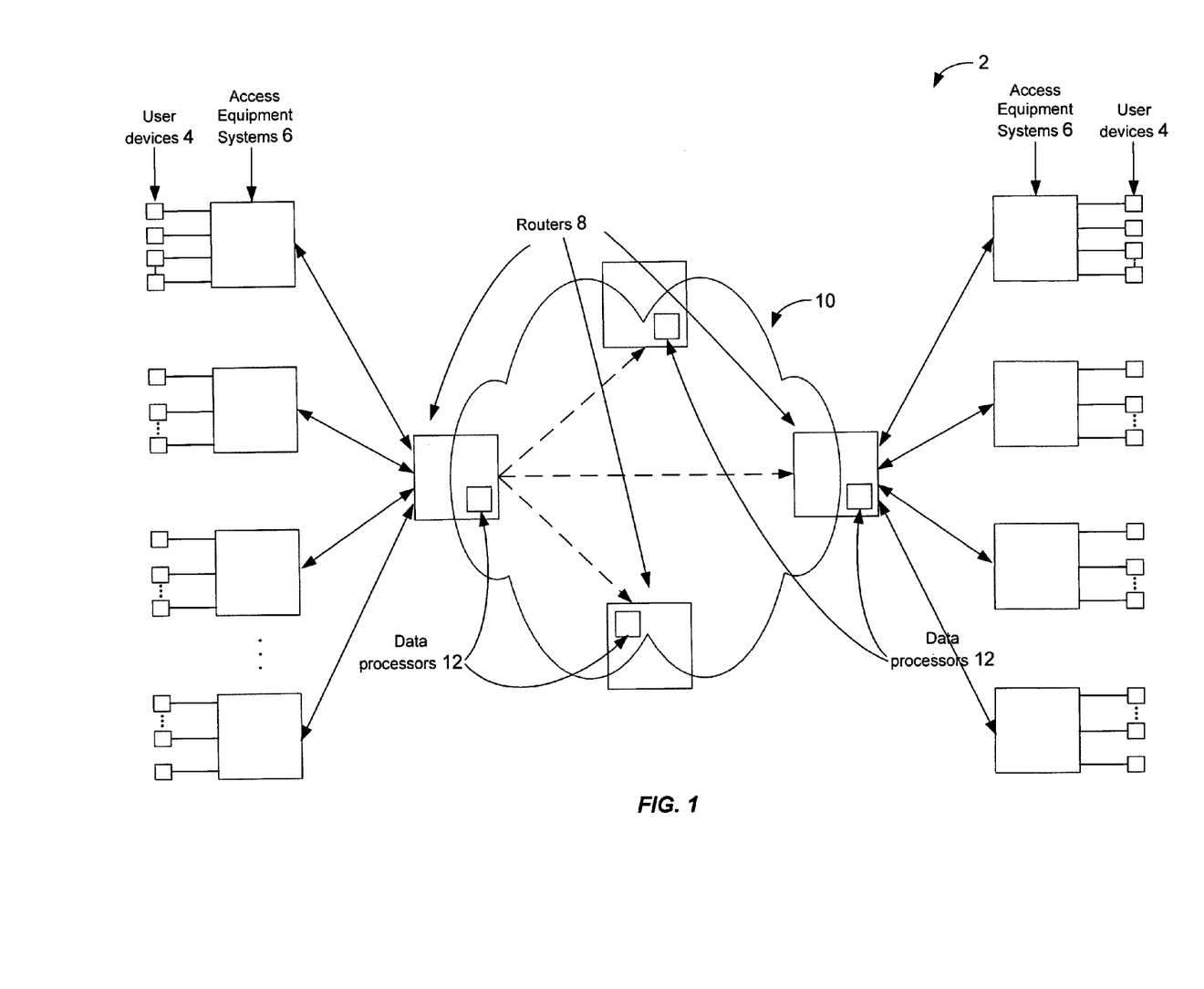
FIG. 1 depicts a simplified block diagram of a telecommunications system according to one embodiment of the present invention.

FIG. 1 depicts a simplified block diagram of a telecommunications system 2 according to one embodiment of the present invention. Telecommunications system 2 includes user devices 4, access equipment systems 6, routers 8, and a network 10.

User devices 4 are computing devices associated with users that communicate data. Examples include personal computers (PCs), customer premise equipment (CPE), user terminals and modems, workstations, personal digital assistants (PDAs), cellular phones, personal PCs, switches, servers and the like. The data are transmitted to access equipment systems 6 through communication lines.

Access equipment systems 6 aggregate and multiplex the data received from user devices 4. Examples of access equipment systems 6 include digital subscriber line access multiplexer (DSLAM), multiplexers, etc. Data received at access equipment systems 6 are then sent to routers 8. Data from a single access equipment system 6 are typically sent in a specific data format and a specific data rate. For example, the data formats include SONET/SDH (OC3, OC12, OC48, etc.), DS3/E3, Ethernet, Gigabit Ethernet, etc. Data in these formats are also transferred at various data rates, where a fixed data rate is associated with a format. Also, the type of physical connection may limit the data rate in which data is transferred. For example, ATM circuits may transfer data at one rate and Ethernet networks may transfer data at another rate.

Router 8 receives the data from access equipment systems 6. Router 8 processes the data in data packets and may send the data packets to one or more other routers 8. Although data packets are referred to, it will be recognized that data may be transferred by other means, such as analog data through a public switched telephone network (PSTN). Data packets are then sent to either another access equipment system 6 and/or to another user device 4 through network 10. Network 10 may be any network, such as the Internet, a wireless network, a wireline network, etc.

Embodiments of the present invention may be included in routers 8 of FIG. 1. For example, a data processor 12 that includes a control plane and one or more data planes may be used to route data. Data is received at router 8, processed by data processor 12, and transferred to a destination. In one embodiment, data packets are routed among data planes in order to transfer data to the destination.

Figure 2:
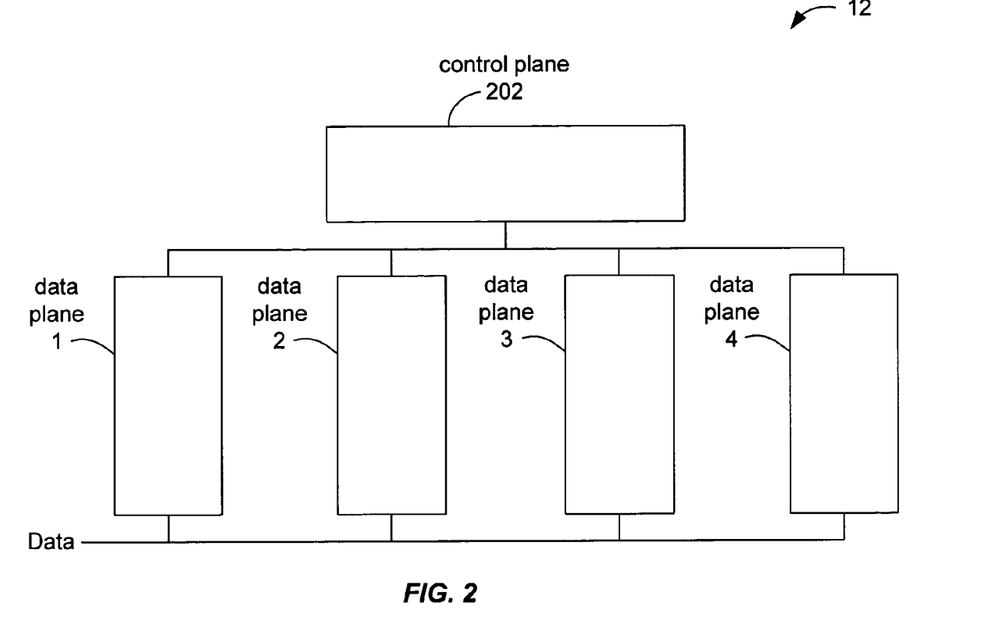
FIG. 2 illustrates an embodiment of a data plane according to the present invention.

FIG. 2 illustrates an embodiment of data processor 12 according to the present invention. Data processor 12 includes a control plane 202 and one or more data planes depicted as a data plane 1, a data plane 2, a data plane 3, and a data plane 4. Although four data planes are shown, it will be understood that any number of data planes may be associated with control plane 202. In one embodiment, data processor 12 is a split plane architecture. Split plane refers to an architecture that distributes processing between control plane 202 and data planes 1, 2, 3, and 4.

In one embodiment, the split plane architecture refers to one in which all control functions are performed in one subsystem and data-processing functions are performed in another subsystem. For example, a control plane for router 8 includes a processor that runs the route protocols and user interfaces. It also maintains the overall system configuration data. The results of such control functions are placed in a set of data forwarding rules. The data plane uses these forwarding rules to process the incoming data packets. One advantage of the split plane architecture is in addressing differing scalability requirements of the control and data planes. The control plane should be scalable with the increasing number of elements in the entire network. The data planes should be scalable with increasing number of elements in the network as well as the bandwidth of the links connecting the elements.

Control plane 202 may be any computing device or data plane configured to communicate with data planes 1, 2, 3, and 4. Control plane 202 determines routes for data planes 1, 2, 3, and 4 and organizes the routes according to a source data plane and a destination data plane. For example, a route may specify that data plane 1 should route data to data plane 2. More specifically, the routes may specify that data should be routed from a port in data plane 1 to a port in data plane 2.

Data planes 1, 2, 3, and 4 may be any data processors. For example, the data planes include virtual and physical circuits to route data and also include quality of service information for various applications such as ATM circuits, IP route and bridging tables, and PPP sessions. Each data plane includes a number of ports. A port on one data plane may exchange data with another data plane port through a switch fabric.

Data planes 1, 2, 3, and 4 may fail at some point in time. When a data plane fails, control plane 202 detects the failure. Also, when a data plane fails, such as data plane 2, the working data planes, such as data planes 1, 3, and 4, should clear any routes associated with data plane 2. This may be referred to as clearing the data plane. When data plane 2 has its failure restarted, it should restore the routes associated with the data planes 1, 3, and 4. Also, data planes 1, 3, and 4 should restore the routes to data plane 2. This may be referred to as "data plane resynchronization".

Conventionally, control plane 202 coordinated the clearing and resynchronization of routes when a data plane failed. In contrast, according to one embodiment of the present invention, the clearing and resynchronization is handled in a distributed manner by both control plane 202 and data planes 1, 2, 3, and 4. In order to allow both control plane 202 and data planes 1, 2, 3, and 4 to respond to failures, a partitioned data structure, such as a data table, is created. The data structure includes partitions or sections that include routes. Each section includes routes for a specific source data plane and a specific destination data plane. Routes between the same two data planes may include different routes between specific ports in each data plane.

Control plane 202 generates and maintains the partitioned data structure and distributes applicable sections of the data structure to various data planes. Each data plane may then handle failures by clearing the sections of the data structure associated with the failed data plane. Also, when a failed data plane is restarted, sections of the data structure that have the restarted data plane as the source data plane may be retrieved by the restarted data plane.

Figure 3:
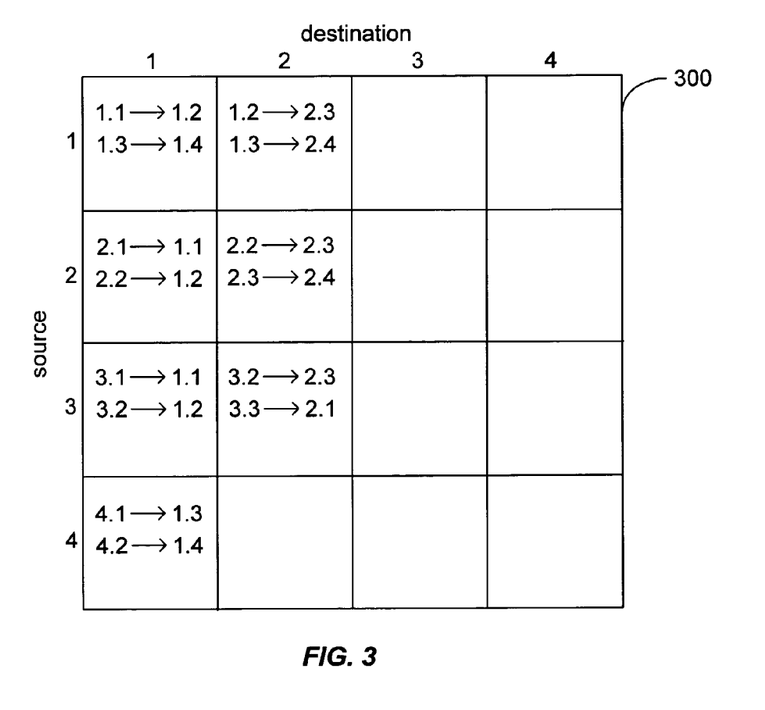
FIG. 3 illustrates a partitioned data structure according to one embodiment of the present invention.

FIG. 3 illustrates a partitioned data structure 300 according to one embodiment of the present invention. As shown, data planes 1, 2, 3, and 4 are referred to as "1", "2", "3", and "4", respectively. Also, the left side of structure 300 represents source data planes and the top of structure 300 represents destination data planes. Thus, a box at the (1, 1) intersection represents a data structure that includes routes from data plane 1 to data plane 1; a box at the (1, 2) intersection represents a data structure that includes routes from data plane 1 to data plane 2; and so on. In one embodiment, each box depicted in data structure 300 may be a separate data structure or structure 300 may be a single data structure with multiple partitions, sections, or files. Each section is partitioned where a data plane can reference and retrieve the section of structure 300.

Data structure 300 is partitioned into N rows and N columns, where N is the number of data planes in the system. Each data plane has N instances in the data structure. An instance is referred to as (I, J) where I denotes the source data plane and J denotes a destination data plane in a route. For example, data plane 1 has four instances of data denoted by (1, 1), (1, 2), (1, 3), and (1, 4). Data plane 2 also has four instances of data denoted by (2, 1), (2, 2), (2, 3), and (2, 4). Data planes 3 and 4 also have four instances, each in a similar structure. Each instance includes routes for the two data planes associated with the instance. For example, the instance (1, 1) includes routes from data plane 1 to data plane 1, the instance (2,1) includes routes from data plane 2 to data plane 1, etc.

Each of the instances in structure 300 are distributed to the source data plane associated with it. Thus, control plane 202 may distribute the sections (1, 1), (1, 2), (1, 3), and (1, 4) to data plane 1, the sections (2, 1), (2, 2), (2, 3), and (2, 4) to data plane 2, and so on for data planes 3 and 4. Thus, referring to structure 300, a row of routes is distributed to each data plane in one embodiment.

Structure 300 may be stored in persistent storage. For example, persistent storage may be available in locations specific to specific data planes, in a location common to all data planes, and in a location common to all data planes and control plane 202. In one embodiment, for each data plane, the associated routes for the source data plane should be available in persistent storage for that data plane. Also, in one embodiment, all sections of structure 300 are available to control plane 202.

In one embodiment, each data instance in data structure 300 may be persistent across restarts of control plane 202 and/or any data plane. Also, data may be persistent across restarts of data planes but not across a restart of a control plane. This data may not be deleted when a data plane restarts but if the control plane restarts, the control plane may delete all the data. Further, data may not persist across restarts of data planes and restarts of control planes. In this case, the data may be cleared when a data plane and/or control plane restarts. The determination on whether data is persistent may depend on the session and protocol associated with data being transferred.

Figure 4:
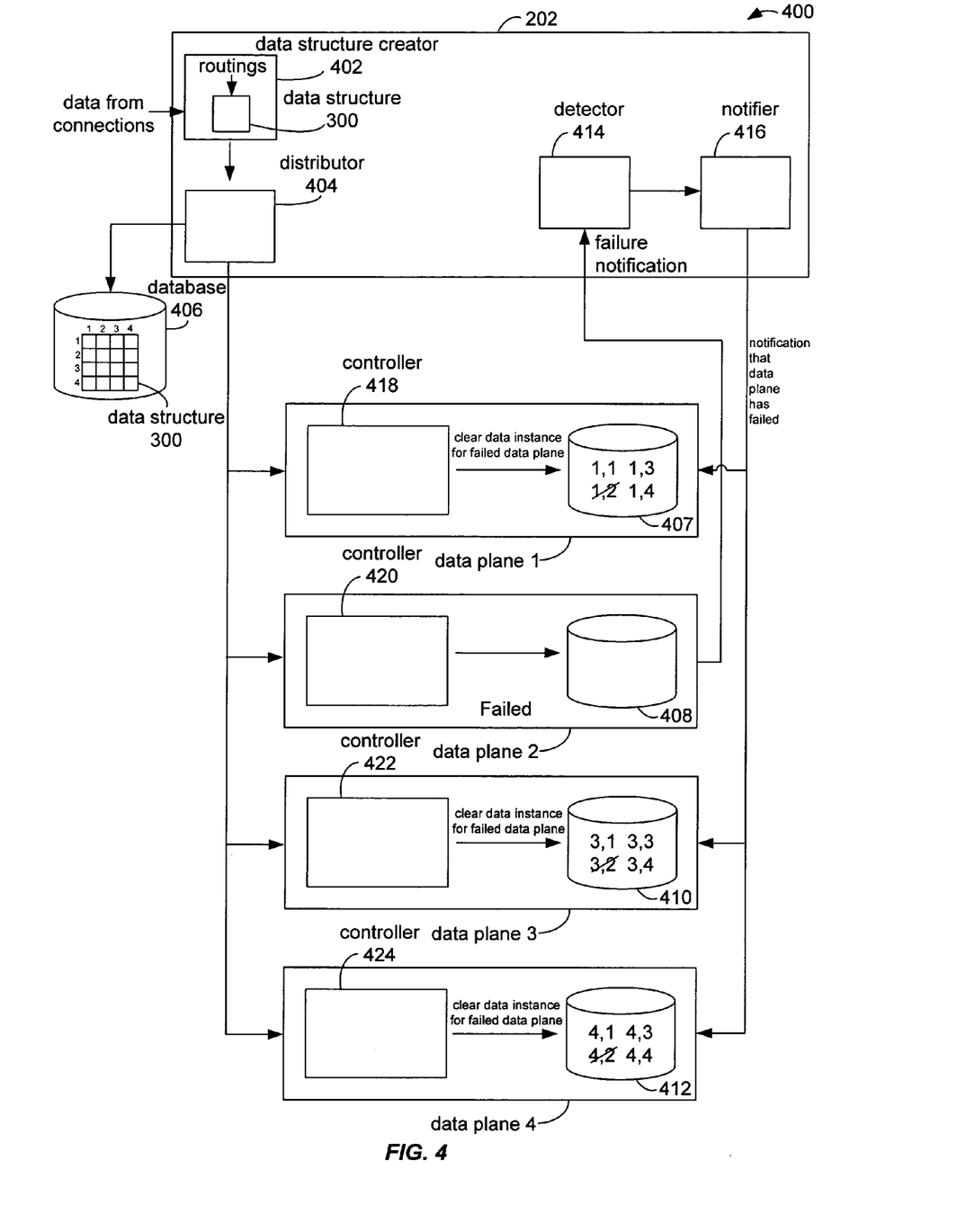
FIG. 4 illustrates a more detailed block diagram of a control plane and data planes 1, 2, 3, and 4.

FIG. 4 illustrates a more detailed block diagram 400 of control plane 202 and data planes 1, 2, 3, and 4. Control plane 202 generates data structure 300 by receiving data for connections at a data structure creator 402. Data structure creator 402 is configured to receive routes and create data structure 300. Once data structure 300 is generated, data structure creator 402 sends data structure 300 to a distributor 404.

Distributor 404 is configured to store data structure 300 in a database 406. In one embodiment, database 406 may be persistent storage that persists after restarts of control plane 202 and/or any data planes. Although database 406 is depicted outside of control plane 202, it will be understood that it may be part of control plane 202. Data structure 300 may also be stored in control plane 202 in addition to database 406.

Distributor 404 determines where to send different sections of data structure 300. Distributor 404 sends the routes associated with a source data plane to each individual source data plane. For example, distributor 404 may send instances of row 1 to data plane 1, instances of row 2 to data plane 2, and so on. Because the routes have been separated by source and destination data planes, different sections may be sent to each data plane.

Each data plane is configured to store the sections of data structure 300. As shown, data plane 1 includes a database 407 that includes the data instances (1, 1), (1, 2), (1, 3), and (1, 4); data plane 2 includes a database 408 that includes the data instances (2, 1), (2, 2), (2, 3), and (2, 4). Data plane 3 and data plane 4 also include a database 410 and a database 412, respectively, that include the respective data planes' data instances.

The process that occurs when a failure is detected will now be described. Control plane 202 includes a detector 414 that is configured to detect failures in data planes 1-4. Detector 414 may monitor the data planes or, when a data plane has failed, a signal may be sent to detector 414. When detector 414 determines that a data plane has failed, other data planes should be notified of the failure. In the example shown, data plane 2 has failed and detector 414 has detected the failure.

Notifier 416 is configured to notify data planes that a failure has occurred. If data plane 2 has failed, then each data plane 1, 3, and 4 should not send data to that data plane. Thus, the routes should be cleared so that data is not transferred to the failed data plane. As shown, notifier 416 notifies data planes 1, 3, and 4.

Once receiving a notification that the data plane has failed, a controller in each data plane determines routes to clear in each database. For example, controller 418 may clear the routes found in the data instance (1, 2), data plane 3 may clear the routes for data instance (3, 2), and data plane 4 may clear the routes for data instance (4, 2). Thus, all the routes to the failed data plane have been cleared.

When clearing the routes is referred to, it will be understood that the instance may be deleted from the databases so data may not be transferred for the routes, each controller for the data planes may just not send data for the routes to the failed data plane without deleting the routes, the route may be set to inactive so that the data is not transferred to the failed data plane, or any other method can be used where data is not transferred to a failed data plane. If routes are not persistent across restarts, then routes are deleted. If routes are persistent across restarts, then routes are not deleted but data packets for the routes may not be transferred until a failed data plane is restarted.

Accordingly, the routes were cleared in a distributed manner because each individual data plane is configured to clear their own routes to the failed data plane. In the example, data planes 1, 3, and 4 cleared their routes to data plane 2 themselves. The distributed nature of sending different instances of data structure 300 to the data planes allowed each data plane to clear its routes to the failed data plane. Also, the partitioning of routes allows a data plane to clear entire sections of routes to failed data planes without parsing other routes to other data planes as might be the case if all routes were including in one table in a mixed fashion. Thus, control plane 202 was removed from the process of clearing routes and only had to detect the failure and notify the working data planes. Also, each data plane only cleared its own routes to the failed data plane.

Figure 5:
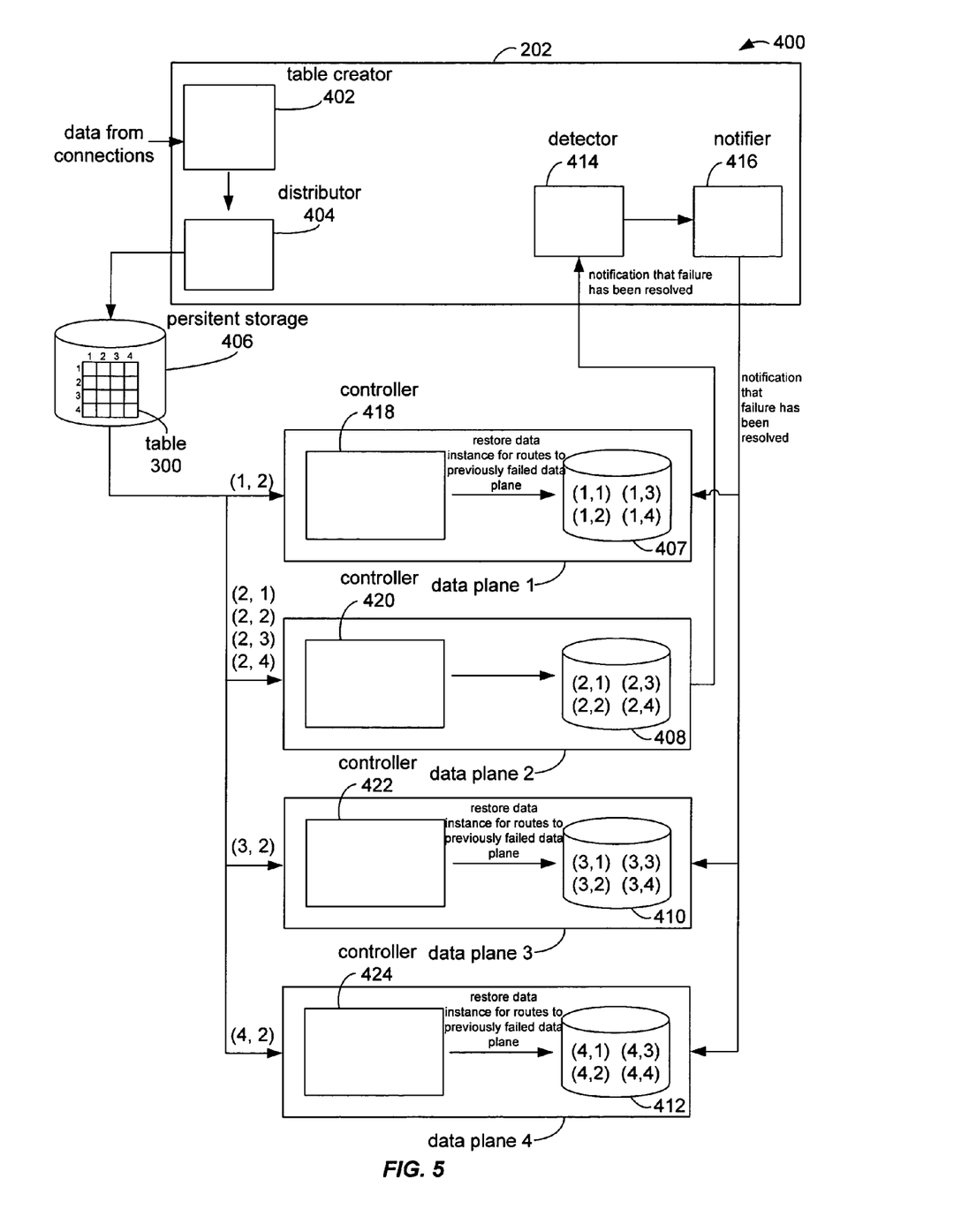
FIG. 5 illustrates an embodiment of a data flow for a system when a failure has been resolved.

The process that occurs when a failed data plane is restarted will now be described. FIG. 5 illustrates an embodiment of a data flow for system 400 when a failure has been resolved. Detector 414 detects that the failure of data plane 2 has been restarted. Data plane 2 may have been restarted or fixed and is now running and ready to transfer data. However, because data plane 2 had failed, all routes that were contained in database 408 have been lost; routes should then be restored for data plane 2. In order to restore the routes, data plane 2 may access data structure 300 and retrieve the routes that have it as the source data plane. In this case, any communication with control plane 202 is not necessary. In another embodiment, distributor 404 retrieves the appropriate instances for data plane 2 from data structure 300 and sends them to data plane 2 in response to a request for the instances. For example, the data instances (2, 1), (2, 2), (2, 3), and (2, 4) are sent to data plane 2 and stored in database 408. With the data instances, data plane 2 can send data according to the routes to the other data planes.

In addition to restoring the routes for data plane 2, the routes for the other data planes 1, 3, and 4 that have not failed should be restored. When notifier 416 sends notifications to data planes 1, 3, and 4 that data plane 2 is running again, each data plane controller restores the applicable routes to data plane 2. For example, controller 418 restores routes for the data instance (1, 2), controller 422 restores routes for the data instance (3, 2), and controller 424 restores routes for the data instance (4, 2).

In restoring the routes, each controller 418, 422, and 424 may be configured to use previously inactive routes in each database 407, 410, and 412 to continue sending data to the previously failed data plane. Also, for each data plane, a controller may contact database 406 and/or control plane 202 and download the appropriate instances to the failed data plane, a controller may set a data instance that had been inactive to active, or any other process to restore the routes may be used. In one embodiment, the routes may be restored without the involvement of control plane 202 (other than the notification). Because data structure 300 has been partitioned, each data plane can specify instances of structure 300. For example, the file (1, 2) can be downloaded by data plane 1. This can be done without parsing routes for other data planes. Also, messaging is minimized because data plane 1 can request an instance and then download the instance. When the routes are restored, each data plane 1, 3, and 4 has been resynchronized with the previously failed data plane.

Accordingly, each individual data plane has restored the routes to the previously failed data plane and also is configured to perform the restoring without direction from control plane 202. Also, the failed database restores its routes to the other data planes. The routes may be restored using data instances associated with each data plane. Thus, a data plane can restore a section of routes to the failed data plane by restoring the instance associated with the failed data plane, for example, the instance (X, 2). This process is done without any processing from control plane 202, which just detects that the failure has been restarted and notifies each of the working data planes. Thus, the processing for synchronizing the data planes is controlled mainly by each working data plane and the process or resynchronization is distributed among the data planes and control processor 202.

Figure 6:
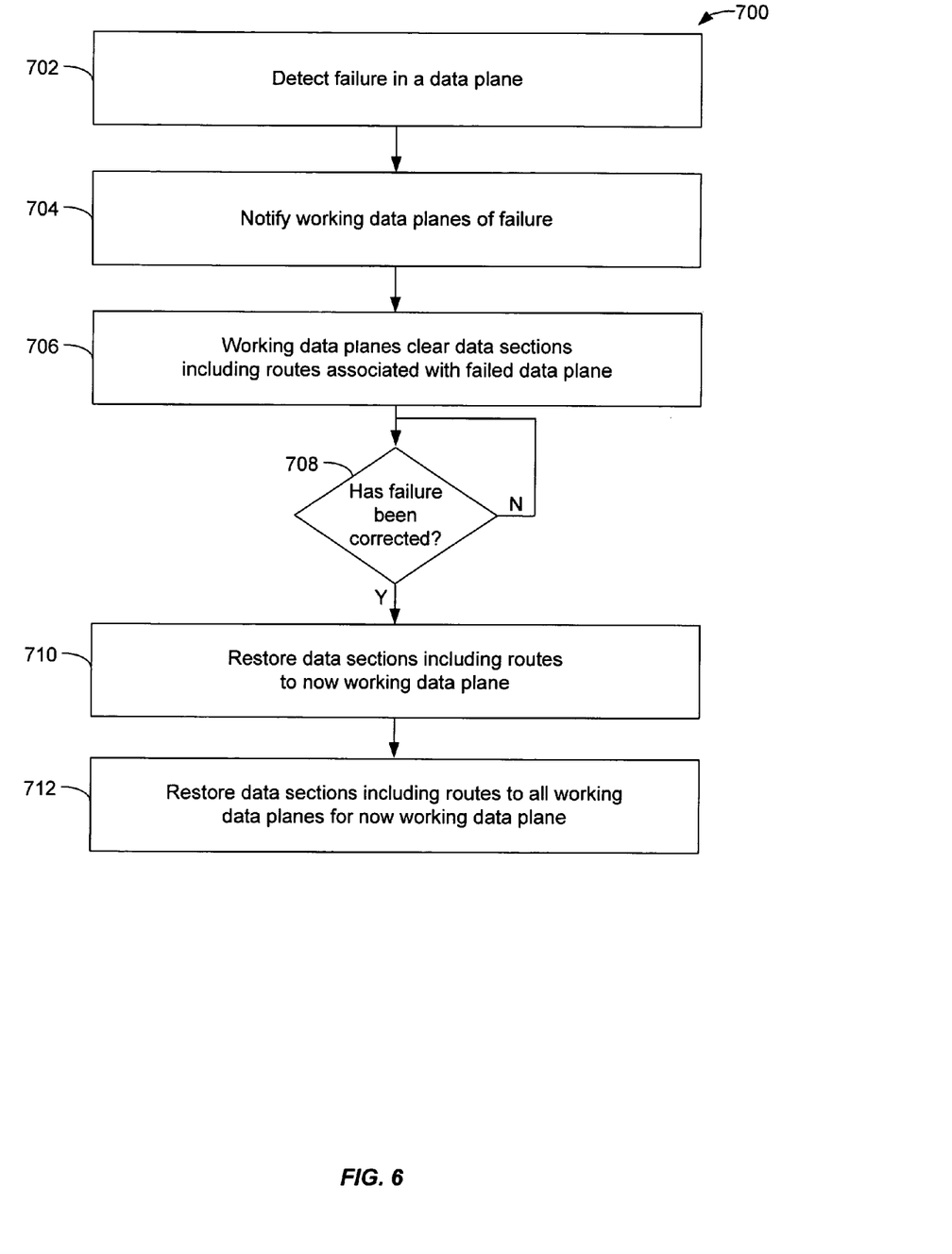
FIG. 6 illustrates a flow chart of a method for handling failures in a data plane according to one embodiment of the present invention.

FIG. 6 illustrates a flow chart 700 of a method for handling failures in a data plane according to one embodiment of the present invention. In step 702, control plane 202 detects a failure in a data plane, such as data plane 1, 2, 3, or 4. The failure of the data plane means that other working data planes cannot route data to the failed data plane.

In step 704, control plane 202 notifies the working data planes of the failure. After receiving the notifications, in step 706, the working data planes clear data sections that include the routes associated with the failed data plane. Thus, the working data planes may not route data to the failed data plane. In clearing the routes, the data planes may remove any data sections that include the failed data plane as the destination data plane from their route table. Accordingly, because all routes to certain data planes have been included in separate data sections, each working data plane may delete the data section associated with the failed data plane.

In step 708, the control plane determines if the failure has been restarted. If the failure has not been restarted, the method reiterates to step 708, where control plane 202 continues to determine if the failure has been restarted.

If the failure has been restarted, in step 710, data sections that may include routes to the now running data plane are restored. In one embodiment, data sections from database 406 are downloaded by each working data plane. For example, each working data plane may access database 406 and retrieve a data section that is associated with the now running data plane. For example, all routes associated with the now running data plane may have been separated according to each source data plane. Accordingly, each working data plane may download a data section associated with itself and the now running data plane.

In step 712, data sections including routes to all working data planes are restored for the now running data plane. In one embodiment, the now running data plane accesses database 406 and downloads data sections that include it as a source data plane.

Accordingly, embodiments of the present invention store routes in separate data structures according to the source data plane and the destination data plane. Thus, routes are grouped separately for each source and destination data plane. The separate data groupings are then distributed to the source data plane associated with the data grouping. Thus, each data plane may have data sections that include the routes that are needed to route data to other data planes.

When failures occur in a data plane, each of the working data planes clear a data section associated with the failed data plane from their route table. The advantage of this is that the control plane is not the central processor for clearing the data planes. Rather, each data plane is responsible for clearing its own routes. Thus, bottlenecks associated with messaging from the control plane are removed. Also, by organizing and grouping the routes together in separate data sections, each working data plane may clear the routes by clearing a data section rather than clearing individual routes from a large route table that includes all routes to all data planes in an unorganized manner.

When the failed data plane has its failure restarted, the working data planes can then restore the routes associated with the now running data plane. In these cases, the working data planes may download from persistent storage a data section that is associated with the now running data plane. The advantage of this is that each data plane can download a data section associated with the now running data plane and the control plane does not have to message each route to each working data plane in order to restore the routes. Accordingly, restoring the routes is accomplished in a distributed manner and can be restored by downloading a section of a data structure.

Also, the now running data plane should restore its routes to all other data planes. In one example, the now running data plane accesses persistent storage and downloads all data sections that have the now running data plane as the source data plane. Thus, the now running data plane has restored its routes without having the control plane as the central processor. Consequently, clearing the routes and restoring the routes have been accomplished in a distributive manner. Also, by grouping routes in data sections, clearing and restoring the routes are accomplished efficiently and can be downloaded all at once.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for handling failures in a data plane of a plurality of data planes, the method comprising:
   generating a partitioned data structure, wherein the partitioned data structure is generated from a control processor separate from the plurality of data planes, the control processor including a failure detector, and the data structure includes one or more partitions for each of the plurality of data planes, each partition including routes for a source data plane to a destination data plane;
   sending one or more partitions from the partitioned data structure to a data plane that is the source data plane in the routes;
   detecting a failure in a failed data plane in the plurality of data planes, wherein the failure detector is configured to detect the failed data plane in the plurality of data planes; and
   notifying data planes other than the failed data plane in the plurality of data planes that the failed data plane has failed, wherein the notified data planes do not send data for the one or more routes found in a partition associated with the failed data plane;

detecting when the failure has been restarted; and notifying the data planes other than the failed data plane that the failure has been restarted, wherein the data planes send data for the one or more routes found in a partition associated with the failed data plane after being notified that the failure has been restarted.

2. The method of claim 1, wherein one partition includes all routes from a source data plane and to a destination data plane.

3. The method of claim 1, further comprising removing any data partitions that have been received at the data planes that have the failed data plane as the destination data plane.

4. The method of claim 3, further comprising if any partitions were removed, restoring the removed partitions.

5. The method of claim 4, further comprising sending the removed partitions to each data plane other than the failed data plane.

6. The method of claim 1, further comprising:

sending one or more partitions that include the failed data plane as the source data plane in the routes to the failed data plane after the failure has been restarted.

7. The method of claim 5, wherein the sending step is initiated by data planes other than the failed data plane.

8. The method of claim 1, further comprising:

storing the data structure in persistent storage; and sending one or more partitions to the failed data plane from the persistent storage after the failed data plane is restarted.

9. The method of claim 8, wherein the sending step is initiated by data planes other than the failed data plane.

10. The method of claim 1, further comprising separating each partition in the partitioned data structure.

11. A method for handling failures in a data plane in a plurality of data planes, the method comprising:

generating a partitioned data structure, wherein the partitioned data structure is generated from a control processor including a failure detector, and the data structure includes one or more partitions for each of the plurality of data planes, each partition including routes for a source data plane to a destination data plane;

sending one or more partitions from the partitioned data structure to a data plane that is the source data plane in the routes;

detecting when a failure in a failed data plane in the plurality of data planes has been resolved, wherein the failure detector is configured to detect the failed data plane in the plurality of data planes; and sending the failed data plane a partition associated with the failed data plane, wherein the partition allows the failed data plane to resume sending data according to the routes found in the partition.

12. The method of claim 11, further comprising notifying data planes other than the failed data plane that the failed data plane has failed, wherein the notified data planes do not send data for the one or more routes found in a partition associated with the failed data plane.

13. The method of claim 11, further comprising notifying data planes other than the failed data plane that the failure has been resolved, wherein the notified data planes resume sending data for the one or more routes found in a partition associated with the failed data plane.

14. The method of claim 11, wherein one partition includes all routes from a source data plane and to a destination data plane.

15. The method of claim 11, further comprising removing any data partitions that have been received at the data planes that have the failed data plane as the destination data plane.

16. The method of claim 15, further comprising if any partitions were removed, restoring the removed partitions.

17. The method of claim 16, further comprising sending the removed partitions to each data plane other than the failed data plane.

18. The method of claim 17, wherein the sending step is initiated by data planes other than the failed data plane.

19. The method of claim 11, further comprising:

storing the data structure in persistent storage; and sending one or more partitions to the failed data plane from the persistent storage after the failed data plane is restarted.

20. The method of claim 19, wherein the sending step is initiated by data planes other than the failed data plane.

21. The method of claim 11, further comprising separating each partition in the partitioned data structure.

22. A system for handling data plane failures, the system comprising:

a plurality of data planes; and a control processor separate from the plurality of data planes; the control processor comprising:

a receiver configured to receive routes for route data, each route specifying a source data plane in which data is sent and a destination data plane in which data is received;

a failure detector configured to detect a failure in a data plane in the plurality of data planes;

a data structure generator configured to generate a data structure that groups the routes by a source data plane for each of the plurality of data planes;

a distributor configured to distribute the grouped routes to each associated source data plane;

a notifier configured to notify data planes other than the failed data plane of the failure, wherein the data planes are configured to not send data to a failed data plane upon the notification, wherein the plurality of data planes comprise storage for storing the grouped routes that are received from the distributor.

23. The system of claim 22, wherein the data planes are configured to remove a partition associated with the failed data plane upon the notification.

24. The system of claim 22, wherein the control processor comprises a detector configured to detect when a failure in a data plane has been restarted.

25. The system of claim 24, wherein the notifier is further configured to notify the data planes other than the failed data plane that the failure has been restarted.

26. The system of claim 25, wherein the data planes other than the failed data plane are configured to start sending data to the data plane whose failure had been restarted.

27. The system of claim 25, wherein the data planes other than the failed data plane are configured to reinstate the partitions associated with the failed data plane whose failure has been restarted.

28. The system of claim 25, wherein the distributor is configured to send the failed data plane whose failure has been restarted partitions that have the failed data plane as the source data plane.

* * * * *